(12) United States Patent
Haverstock

(10) Patent No.: US 8,544,412 B1
(45) Date of Patent: Oct. 1, 2013

(54) PET FOOD HOLDER

(76) Inventor: Linda Haverstock, Dillsburg, PA (US)

( * ) Notice: Subject to any disclaimer, the term of this patent is extended or adjusted under 35 U.S.C. 154(b) by 301 days.

(21) Appl. No.: 13/136,805

(22) Filed: Aug. 11, 2011

Related U.S. Application Data

(60) Provisional application No. 61/401,594, filed on Aug. 16, 2010.

(51) Int. Cl.
  *A01K 5/00* (2006.01)
  *A01K 5/01* (2006.01)
  *A01K 39/00* (2006.01)

(52) U.S. Cl.
  USPC ..................................... 119/61.54; 119/61.5

(58) Field of Classification Search
  USPC .............................................. 119/61.5, 61.54
  See application file for complete search history.

(56) References Cited

U.S. PATENT DOCUMENTS

| | | | | |
|---|---|---|---|---|
| 2,813,509 | A * | 11/1957 | Bruno | 119/51.01 |
| 3,734,062 | A * | 5/1973 | O'Hara | 119/61.54 |
| 4,534,391 | A * | 8/1985 | Ventimiglia et al. | 220/739 |
| 4,716,855 | A * | 1/1988 | Andersson et al. | 119/61.54 |
| 4,938,373 | A * | 7/1990 | McKee | 220/23.86 |
| 5,133,293 | A * | 7/1992 | Boozer | 119/61.57 |
| 5,607,077 | A * | 3/1997 | Torkelson | 220/575 |
| 5,961,086 | A * | 10/1999 | Moore et al. | 248/314 |
| 6,149,027 | A * | 11/2000 | Rathjen | 220/574 |
| 6,609,625 | B1 * | 8/2003 | Gibbar | 220/574 |
| 7,040,252 | B2 * | 5/2006 | Wetterer et al. | 119/61.54 |
| 2010/0242847 | A1 * | 9/2010 | Gray | 119/61.54 |

* cited by examiner

*Primary Examiner* — Monica Williams
(74) *Attorney, Agent, or Firm* — Neal E. Abrams; Andrew D. Mead

(57) ABSTRACT

A holder for frictionally holding a container of pre-packaged pet food has a bowl into which the container of pre-packaged pet food in placed and an anchor arm extending radially outwardly from the bowl. A plurality of ribs protrude inwardly from the inside walls of the bowl. The ribs terminate in edges having a compound curvature which frictionally engage the outside walls of the prepackaged container of pet food to the extent that it cannot easily be dislodged by the efforts of a pet to consume the food that is in the container. The pet food holder is provided with a slip resistant bottom surface and is manufactured from a material that has sufficient elastomeric properties that the cavity can accommodate pre-packaged containers of various sizes and shapes and sufficient frictional properties as to promote frictional interaction with the surface upon which the pet feeder is placed. The anchor arm can be engaged by the pet's paw or wedged under fixed objects to further prevent it from moving about as the pet consumes its contents.

18 Claims, 4 Drawing Sheets

US 8,544,412 B1

PET FOOD HOLDER

RELATED PATENT APPLICATION

Support for the disclosure in this application is found in the applicant's Provisional Patent Application No. 61/401,594, filed Aug. 16, 2010.

BACKGROUND OF THE INVENTION

This invention relates generally to a device for holding pet food, and more particularly to a device that is capable of securely holding packages of pre-packaged pet food and treats.

It has become increasingly common to provide food and treats for dogs and cats in sealed pre-packaged cup-like containers similar to those used for puddings and fruit for humans. Along with conventional wet or dry foods, it has also become popular to provide pets with frozen treats packaged in such containers. It would seem to be convenient to allow the pets to partake of the food or treats directly from the pre-packaged container by holding the containers in the owner's hand or placing them on the floor. However, that is not the case, for holding the container in one's hand is cumbersome and time-consuming for both the owner and the pet, and placing it on the floor results in the pet pushing the container around on the floor and overturning it in the pet's zeal to consume its contents. This is frustrating to the pet and causes the food or treat to be spilled on the floor, necessitating a clean-up effort for the owner. Even if the pre-packaged container is placed in a larger bowl, the result inevitably is for the pet to push the container out of the bowl and overturn it onto the floor. The problem becomes greater with frozen treats, where the intent is to increase the time period over which the pet enjoys the treat. However, this results in the container being pushed around for a longer period of time over a larger area of the floor, causing more frustration for the pet and a larger clean-up problem for the owner.

It is an object of this invention to provide a pet food holder that alleviates these problems by securely holding pre-packaged cups of pet food or treats, particularly but not exclusively those that are frozen, and preventing them from being overturned or pushed about on the floor.

Another object of this invention is to provide a pet food holder that can be held in place by the pet as it feeds from the holder, thus preventing it from moving about on the floor.

Another object of this invention is to provide a means for securing the holder beneath a person's foot or the leg of a piece of furniture, or wedging it under a piece of furniture or the bottom edge of a door.

Another object of this invention is to provide a pet food holder that can accommodate and secure in place prepackaged pet food containers of varying sizes, shapes and material.

Still another object of this invention is to provide a pet food holder that secures in place pet food and treats that have been frozen in place in the holder.

SUMMARY OF THE INVENTION

The pet food holder of this invention comprises a receptacle portion comprising a bowl for receiving a container of pre-packaged pet food and an anchor portion comprising an anchor member extending outwardly from the receptacle portion. The anchor member preferably is in the form of an arm. At least one engagement member extends inwardly from the inside surface of the bowl. The engagement members frictionally engage the outside walls of a prepackaged container of pet food that is inserted into the bowl in such a manner as to secure it in the bowl to the extent that it cannot easily be dislodged by the efforts of a pet to consume the food that is in the container. The engagement members also can interlock with unpackaged liquid treats that have been frozen in the bowl. The engagement members each comprise a rib protruding from the inside surface of the bowl, and each rib terminates in an edge having a compound curvature. The pet food holder is provided with a slip resistant bottom surface and is manufactured from a material that has sufficient elastomeric and frictional properties that the bowl can accommodate pre-packaged containers of various sizes and shapes and resists movement when placed upon a substantially flat surface.

BRIEF DESCRIPTION OF THE DRAWINGS

For a more complete understanding of the invention, and to illustrate the objects and advantages of the invention, reference is made to the following description of a preferred embodiment of the invention taken in conjunction with the accompanying drawings, in which.

DESCRIPTION OF A PREFERRED EMBODIMENT OF THE INVENTION

Figure 1:
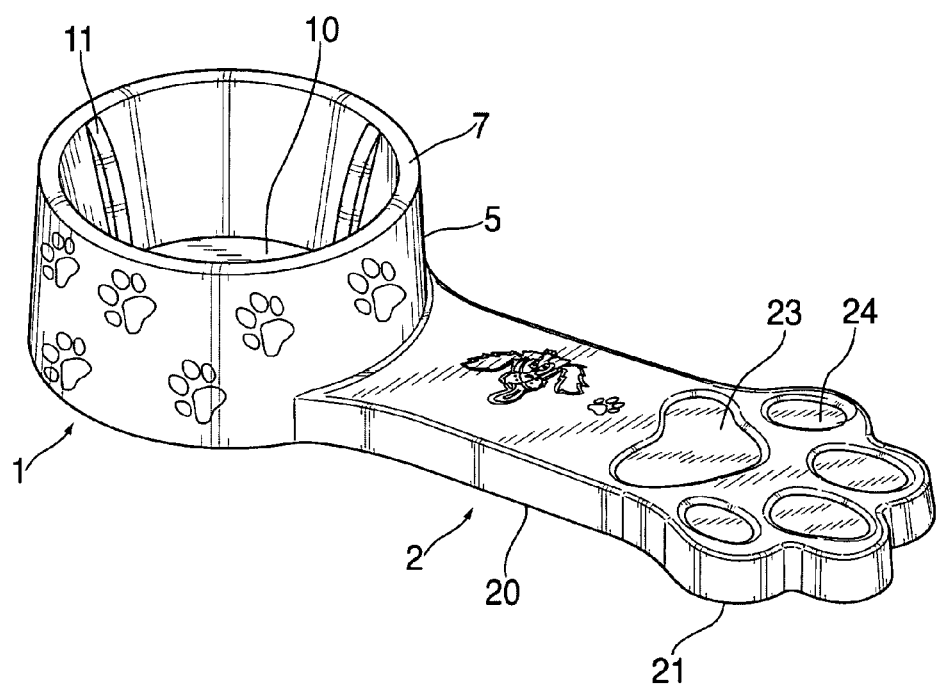
FIG. 1 is a top perspective view of a preferred embodiment of the invention.
Figure 2:
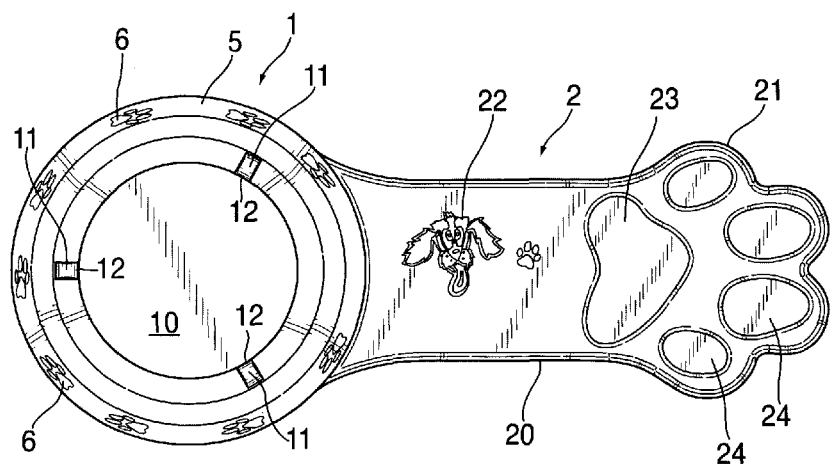
FIG. 2 is a top view of the embodiment shown in FIG. 1.
Figure 3:
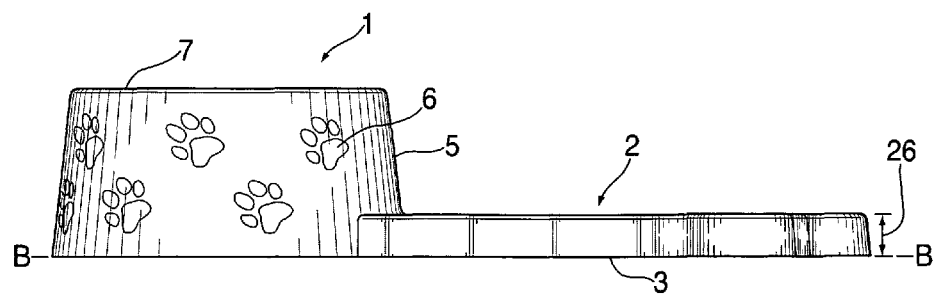
FIG. 3 is a side view of the embodiment shown in FIG. 1.

As shown in the various Figures, the embodiment of the invention illustrated and described herein comprises a receptacle portion 1 and an anchor portion in the form of an arm 2. Arm 2 is integral with receptacle portion 1, and shares a planar common bottom surface plane B-B with receptacle portion 1. The entire pet food holder is constructed of a material having elastomeric properties, such as rubber or rubber-like material, which by its very nature also provides a slip resistant bottom surface 3 in flat plane B-B (FIG. 3). A preferred material is thermoplastic polymer that has a rubbery feel and a soft touch, is dishwasher safe, and which can be frozen but remains pliable and non-skid after being removed from the freezer. A preferred method of manufacture is by molding the entire device in one piece, although the invention is not restricted to such type of construction. The material also should be non-toxic to pets and resistant to being easily destroyed by chewing.

In the preferred embodiment described herein, receptacle portion 1 has an inclined annular exterior bowl surface 5, generally in the shape of a truncated cone, which can be provided with decorative designs or embossing, such as paw prints 6. A circular rim 7 constitutes the upper edge of a bowl 8, which is defined by an inclined annular interior side surface 9, generally in the shape of a truncated cone, joined to a bottom inside surface 10 that has a circular periphery. Although shown in the preferred embodiment as sections of truncated cones, outer surface 5 and interior side surface 9 can be of other shapes, such as a right cylinder or a plurality of inclined or non-inclined flat or scalloped panels.

Protruding inwardly from interior side surface 9 toward the center of bowl 8 are three equally spaced ribs 11, the function of which is to frictionally engage a pre-packaged container of pet food or treats. Ribs 11 advantageously are aligned perpendicularly to bottom inside surface 10. Each rib 11 terminates in an inwardly facing curved edge 12 which preferably is of compound curvature comprising an upper curved edge portion 13 and a lower curved edge portion 14. Upper curved edge portion 13 has a shorter radius of curvature than lower curved edge portion 14, thus producing a greater curvature in upper curved edge portion 13 and a lesser curvature in lower curved edge portion 14. For example, the radius of upper curved edge portion 13 can be about one inch while the radius of lower curved edge portion 14 is about seven inches. Each rib 11 extends along interior side surface 9 from a point adjacent to rim 7 to a point adjacent to bottom surface 10, a depth indicated by the numeral 18 in FIG. 4. While the invention is not limited to this particular number of ribs, three equally spaced ribs 11 having this compound curvature of edges 12 very effectively frictionally interact with a multitude of sizes and shapes of prepackaged containers of pet treats or foods, thus not limiting the invention to use with a prepackaged container that is exactly the same size and shape as the interior of bowl 8.

Figure 5:
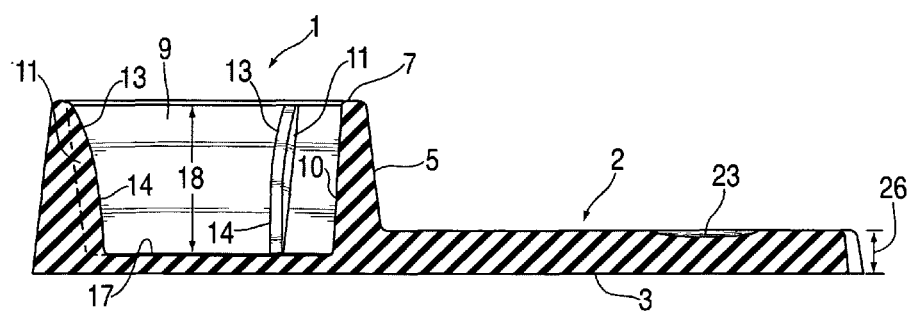
FIG. 5 is a side view of the embodiment shown in FIG. 1, partially in section.
Figure 6:
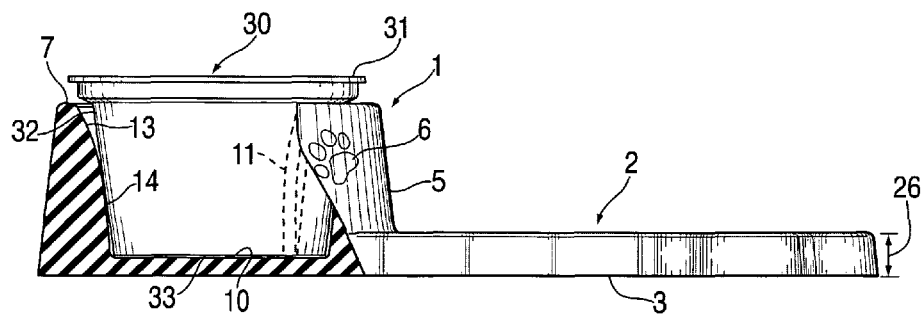
FIG. 6 is a side view of the embodiment shown in FIG. 1, partially in section, showing a cup-like container of pre-packaged pet food of shape and dimensions closely approximating those of the bowl, installed in the bowl.

For ease of explanation of the operation of the invention, FIG. 5 shows a pet food container 30 that is of a cup shape that closely approximates the interior shape and dimensions of bowl 8. When container 30 is pressed into bowl 9, the outer walls of container 30 contact at least portions of the curved edges 12 of ribs 11, which contact causes container 30 to be frictionally secured in bowl 8, to the extent that ribs 11 may deform the walls of container 30 inwardly. However, as stated above, the configuration of ribs 11 also allows bowl 8 to accommodate and effectively frictionally secure containers that are not of the same size and shape of the interior of bowl 8, such as containers having a plurality of flat or scalloped side panels, those having side walls of different inclinations, and those of diameters somewhat greater or lesser than that of the container 30 that is shown in FIG. 5. These capabilities are the result of the compound curvature of ribs 11, coupled with the fact that bowl 8 is made of a somewhat deformable material.

Another advantageous result of the above-described construction is that while ribs 11 press against the sides of container 30 to secure it in place, the amount of surface area that is placed into contact with the side of the container is minimal when compared to full wall-to-wall contact between the outer surface of the container and the inner surface of the bowl. This allows the container to be more easily inserted into and removed from bowl 8, considering that the objective is to secure the food container in bowl 8 with such force as to resist the efforts of the pet to remove it from the bowl. Typically, effective dimensions for the interior of bowl 8 are a diameter at the top of about 2.88 inches and at the bottom about 2.25 inches, with a depth of about 1.5 inches. Effective dimensions for ribs 11 are a width of 0.188 inches and a height at the maximum point of curvature of 0.156 inches.

An anchor member in the form of an arm 2 extends outwardly from receptacle portion 1 with its bottom surface aligned along plane B-B. Arm 2 comprises a neck 20 and a widened pad 21. Decorative material 22 can be placed upon neck 20 or embossed therein. Pad 21 is provided in its upper surface with a major indentation 23 and a plurality of minor indentations 24, shown as a representation of an animal paw, although they need not be limited to this design. Indentations 23 and 24 are not only for decorative purposes, but are such size and depth as to be capable of engaging the bottom surface of the distal end of a leg of a piece of furniture, such as a table or chair, to anchor the inventive device and prevent it from moving about. Although shown as extending only partially through the thickness 26 of pad 21, indentations 23 and 24 also can extend completely therethrough. The thickness of arm 2 is sufficient to allow it to be wedged under a piece of furniture, an appliance, or the bottom edge of a door. In this regard, typical dimensions of arm 2 are a length of about 4.5 inches, a width of about 2.5 inches, and a thickness of about 0.5 inches. These dimensions also are sufficient to allow the pet to engage arm 2 with its paw or leg to secure the pet food holder in place while the pet consumes the food or treat. Other configurations of arm 2 also are within the scope of the invention. While arm 2 is shown as extending radially outwardly from receptacle portion 1, it also can deviate from this angle, so long as it provides an anchor for the device when in use, as is explained below.

Figure 4:
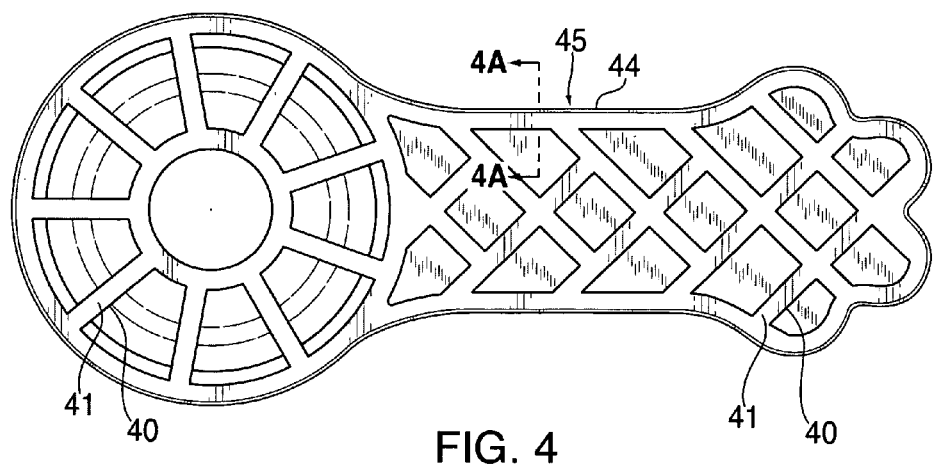
FIG. 4 is a bottom view of the embodiment shown in FIG. 1.
Figure 4A:
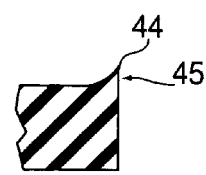
FIG. 4A is an enlarged sectional view taken through line C-C of FIG. 4 showing a lip that can be provided about the periphery of the bottom surface of the device.

The bottom surface 3 of the inventive pet food holder is configured to provide good frictional contact with the surface upon which it is placed, such as a substantially flat floor. This capability is the result of the inherent properties of the material from which the holder is made, but is enhanced according to the invention by providing a particular bottom construction. As shown in FIG. 4, a plurality of cross-hatched walls 40 terminate in wall edges 41, which are aligned with plane B-B. This construction improves frictional interaction between the pet food holder and the floor upon which it is placed even when the floor is wet or is a bit uneven, thus further inhibiting movement of the device when the pet is consuming its contents. Frictional contact with the surface can further be enhanced by providing a downwardly oriented shallow lip extending around the entire periphery of the bottom of the pet food holder. As shown in enlarged cross-section in FIG. 4A, lip 44 terminates in a sharp edge 45. Typical dimensions for lip 44 are a base width of 0.0625 inches and a height of 0.0625 inches.

In addition to being prevented from slipping on a floor by means of non-slip bottom surface 3, the pet food holder can be held in place by forces acting upon arm 2. In this regard, a pet attempting to consume the contents of the bowl can naturally place its foot or leg on or over the top surface of thickened arm 2, thus itself inhibiting the pet food holder from moving. Or, the pet can be trained to do so. A person also can place their foot upon arm 2 to accomplish the same objective. Additionally, the distal end portion of arm 2 can be pressed or wedged into an opening under a piece of furniture, an appliance, a door, or a rug or door mat, to anchor the device against moving about. It can be placed under the leg of a piece of furniture such as a table or chair, including those with wheels or rollers, with the foot of the leg being received in one or more of cavities 23 and 24 to prevent it from slipping off of the top surface of arm 2.

The inventive device is particularly well suited to allow pets to enjoy the contents of a pre-packaged food or treat container without the device slipping about on the floor or easily tipping over. However, it also provides the same advantages when loose food or treats are placed in bowl 8. In addition to receiving prepackaged food and to being used as a conventional food bowl, the device is also suited to being filled with a liquid pet treat and then frozen, so that the treat becomes solid. In this situation, ribs 11 protrude into the unpackaged frozen treat to secure it in place as the pet enjoys it, in a manner similar to that in which the ribs secure a container in place.

It is not intended that the invention be limited to the specific embodiment described above. Various modifications of that embodiment may occur to those skilled in the art without departing from principles, concepts, spirit and scope of the invention.

The invention claimed is:

1. A pet food holder for receiving a container of pre-packaged pet food, comprising:
 a bowl defined by an interior bottom surface and an interior side surface upstanding from said interior bottom surface and terminating in an upper rim;
 said bowl further comprising an exterior bottom surface disposed in a bottom plane for supporting said pet food holder on a surface;
 at least one elongated member on said interior side surface and protruding inwardly of said bowl from said interior side surface, each said elongated member having a curved portion terminating in a contact surface frictionally engageable with a container of pre-packaged pet food inserted into said bowl; and
 an anchor member comprising a narrow arm extending radially outwardly from said bowl, said anchor member comprising an anchor member bottom surface co-planar with said bottom plane and a thickness defined by an upper surface and an indentation in said upper surface into said thickness for receiving the distal end of a leg of a piece of furniture to anchor said pet food holder thereunder.

2. The pet food holder of claim 1 wherein said contact surface of each said elongated member comprises a first curved portion having a first radius of curvature and a second curved portion having a second radius of curvature greater than said first radius of curvature.

3. The pet food holder of claim 2 wherein said first curved portion is adjacent to said upper rim and said second curved portion extends from said first curved portion toward said interior bottom surface.

4. The pet food holder of claim 3 further comprising a plurality of said elongated members spaced about said interior side surface.

5. The pet food holder of claim 1 wherein said exterior bottom surface and said anchor member bottom surface comprise a plurality of cross-hatched walls with each said wall terminating in a wall edge aligned with said bottom plane.

6. The pet food holder of claim 1 further comprising a shallow lip extending downwardly from and around the peripheries of said exterior bottom surface and said anchor member bottom surface.

7. The pet food holder of claim 6 wherein said anchor member further comprises a thickness defined by an upper surface and an indentation in said upper surface into said thickness for receiving the distal end of a leg of a piece of furniture to anchor said pet food holder thereunder.

8. A pet food holder for receiving a container of pre-packaged pet food, comprising:
 a bowl defined by an interior bottom surface and an interior side surface upstanding from said interior bottom surface and terminating in an upper rim;
 said bowl further comprising an exterior outer side surface and an exterior bottom surface oriented in a bottom plane for supporting said pet food holder on a surface;
 a plurality of elongated ribs on said interior side surface and protruding inwardly of said bowl from said interior side surface, each of said plurality of elongated ribs terminating in a curved edge frictionally engageable with a container of pre-packaged pet food inserted into said bowl; and
 an anchor member comprising a narrow arm extending radially outwardly from said bowl, said anchor member comprising an anchor member bottom surface coplanar with said bottom plane and a thickness defined by an upper surface and an indentation in said upper surface into said thickness for receiving the distal end of a leg of a piece of furniture to anchor said pet food holder thereunder.

9. The pet food holder of claim 8 wherein said edge of each said elongated rib extends from a point adjacent to said rim to a point adjacent to said bottom surface and comprises a first curved portion having a first radius of curvature and a second curved portion having a second radius of curvature greater than said first radius of curvature.

10. The pet food holder of claim 9 wherein said plurality of elongated ribs are substantially equally spaced about said bowl and each said elongated rib is oriented substantially perpendicularly to said bottom plane with said first curved portion adjacent to said rim and said second curved portion extending from said first curved portion toward said bottom surface.

11. The pet food holder of claim 8 wherein said exterior bottom surface of said bowl and said anchor member bottom surface each comprise a plurality of cross-hatched walls with each said wall terminating in a wall edge aligned with said bottom plane.

12. The pet food holder of claim 11 further comprising a shallow lip extending downwardly from and around the entire peripheries of said exterior bottom surface and said anchor member bottom surface.

13. The pet food holder of claim 8 further comprising a shallow lip extending downwardly from and around the entire peripheries of said exterior bottom surface and said anchor member bottom surface.

14. A pet food holder for receiving a container of pre-packaged pet food, comprising:
 a bowl defined by an interior bottom surface, an outwardly inclined interior side surface upstanding from said interior bottom surface and terminating in an upper rim, an exterior side surface extending downwardly from said upper rim, and an exterior bottom surface oriented in a bottom plane substantially parallel to said rim for supporting said pet food holder on a surface;
 a plurality of elongated ribs substantially equally spaced about said interior side surface, each of said elongated ribs terminating in an inwardly oriented rib edge frictionally engageable with a container of pre-packaged pet food inserted into said bowl, said rib edge of each said elongated rib being oriented substantially perpendicularly to said bottom plane and extending from a point adjacent to said rim to a point adjacent to said bottom surface, said rib edge of each said elongated rib comprising a first curved portion having a first radius of curvature and a second curved portion having a second radius of curvature greater than said first radius of curvature;
 a narrow arm extending substantially radially outwardly from said exterior surface of said bowl, said arm comprising an arm bottom surface coplanar with said bottom plane, a thickness defined by an arm upper surface, and an indentation in said upper surface into said thickness for receiving the distal end of a leg of a piece of furniture to anchor said pet food holder thereunder; and
 wherein said pet food holder is of a material having elastic and frictional properties.

15. The pet food holder of claim 14 wherein said first curved portion of each said rib edge is adjacent to said rim and said second curved portion of each said rib edge extends from said first curved portion toward said bottom surface.

16. The pet food holder of claim 14 wherein said exterior bottom surface of said bowl and said arm bottom surface comprise a plurality of cross-hatched walls oriented substantially perpendicularly to said bottom plane with each said cross-hatched wall terminating in a wall edge aligned with said bottom plane.

17. The pet food holder of claim 16 further comprising a shallow lip extending downwardly from and around the entire peripheries of said exterior bottom surface and said anchor member bottom surface.

18. The pet food holder of claim 14 wherein said plurality of elongated ribs comprises three ribs.

* * * * *